United States Patent
Abernathy et al.

(10) Patent No.: US 6,934,729 B2
(45) Date of Patent: Aug. 23, 2005

(54) METHOD AND SYSTEM FOR PERFORMING SHIFT OPERATIONS

(75) Inventors: Christopher Michael Abernathy, Austin, TX (US); Scott Raymond Cottier, Austin, TX (US); Gilles Gervais, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 09/981,902

(22) Filed: Oct. 18, 2001

(65) Prior Publication Data

US 2003/0078950 A1 Apr. 24, 2003

(51) Int. Cl.⁷ .............................................. G06F 5/01
(52) U.S. Cl. ...................................................... 708/209
(58) Field of Search ......................................... 708/209

(56) References Cited

U.S. PATENT DOCUMENTS

| | | | | |
|---|---|---|---|---|
| 5,896,305 A | * | 4/1999 | Bosshart et al. | 708/209 |
| 6,675,181 B1 | * | 1/2004 | Tovey | 708/209 |
| 6,675,182 B1 | * | 1/2004 | Hofstee et al. | 708/209 |
| 6,757,819 B1 | * | 6/2004 | Hoyle et al. | 712/300 |
| 2003/0023646 A1 | * | 1/2003 | Lin et al. | 708/209 |

* cited by examiner

*Primary Examiner*—D. H. Malzahn
(74) *Attorney, Agent, or Firm*—Carr LLP; Diana Roberts Gerhardt

(57) ABSTRACT

A method and an apparatus for performing a shift operation on an operand. The method and apparatus configures input lines to comprise a first part that includes the bits in order representing various shift amounts in a first direction and a second part that includes bits ordered representing various shift amounts in a second direction. The shift is then performed by selecting the appropriate bits from the input line to create the result.

30 Claims, 3 Drawing Sheets

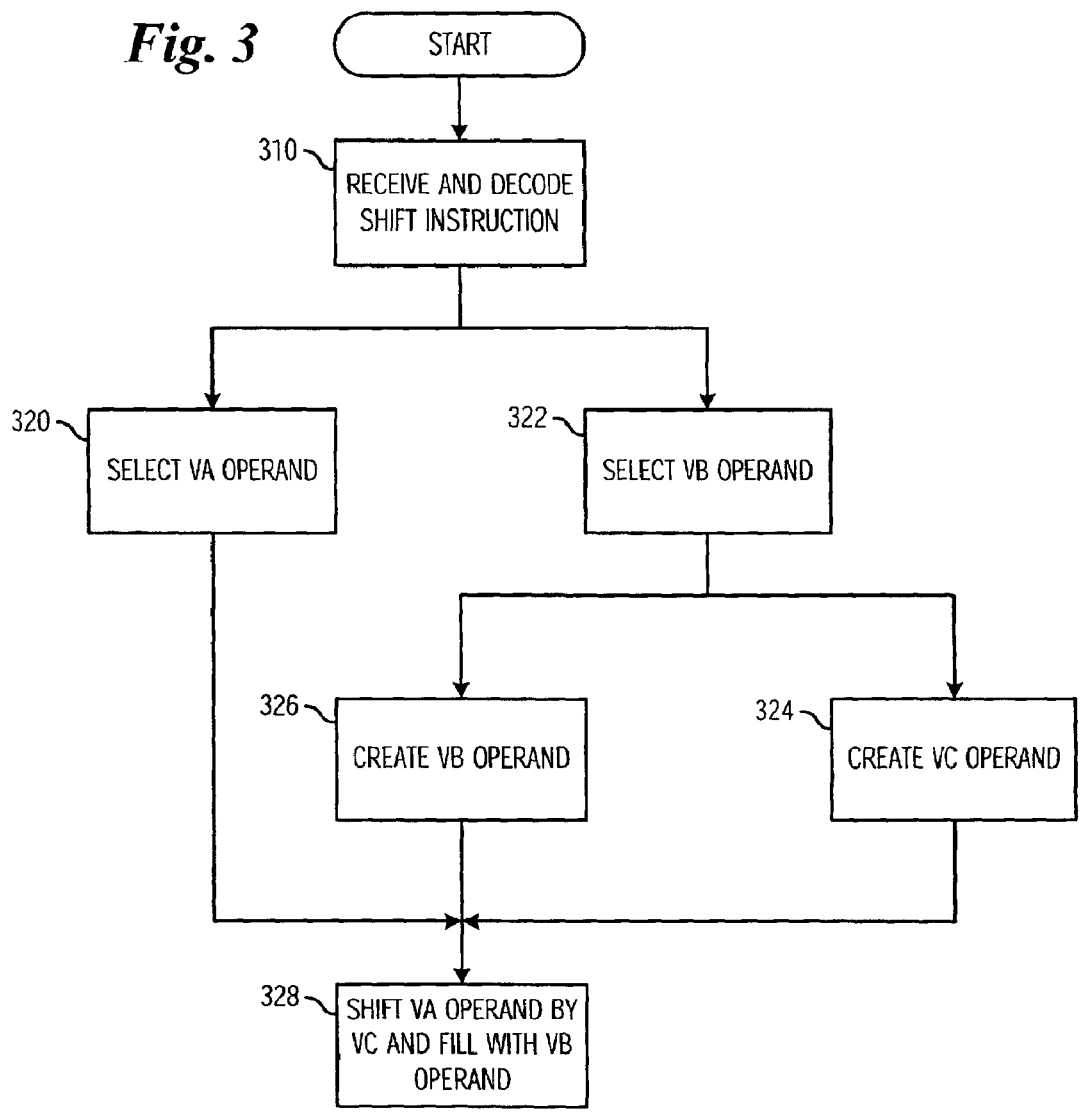

METHOD AND SYSTEM FOR PERFORMING SHIFT OPERATIONS

BACKGROUND OF THE INVENTION

1. Field of the Invention

The invention relates generally to computer architectures and, more particularly, to a method and an apparatus for shifting an operand a specified direction and amount.

2. Description of Related Art

Computer processors are constantly being designed with additional capabilities. In particular, some processors, such as the PowerPC designed by IBM Corp., Apple Computers Corp., and Motorola, Inc., are being modified to provide multimedia extensions, such as the Vector Multimedia Extension (VMX). Some extensions such as a shift instruction, however, require additional processing and, therefore, may not be as efficient as desired.

Shift instructions frequently utilize multiple operands to specify the desired action. A first operand typically specifies the operand that is to be shifted left or right, a second operand typically specifies the amount that the first operand is to be shifted, and a third operand typically specifies the location to place the result. Additional, or fewer, operands may be present depending on the implementation.

Generally, the second operand that specifies the amount must be decoded to extract the necessary information and to format the information appropriately. The process of decoding the second operand, however, is processing-intensive and requires additional space.

Therefore, there is a need to provide a method and an apparatus for efficiently shifting a value a specified amount and direction.

SUMMARY

The present invention provides a method and an apparatus for performing a shift operation on an operand. The method and apparatus configures an input line comprising a first part that includes the bits in order representing various shift amounts in a first direction and a second part that includes bits ordered representing various shift amounts in a second direction. The shift amount is then utilized to index into the input line and select the appropriate bits to create the result.

BRIEF DESCRIPTION OF THE DRAWINGS

For a more complete understanding of the present invention, and the advantages thereof, reference is now made to the following description taken in conjunction with the accompanying drawings, in which:

FIG. 3 is a data flow diagram illustrating one embodiment of the present invention in which an operand is shifted a specified direction and amount.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning operation and the connectivity of the individual components of the present invention, and the like, have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

Figure 1:
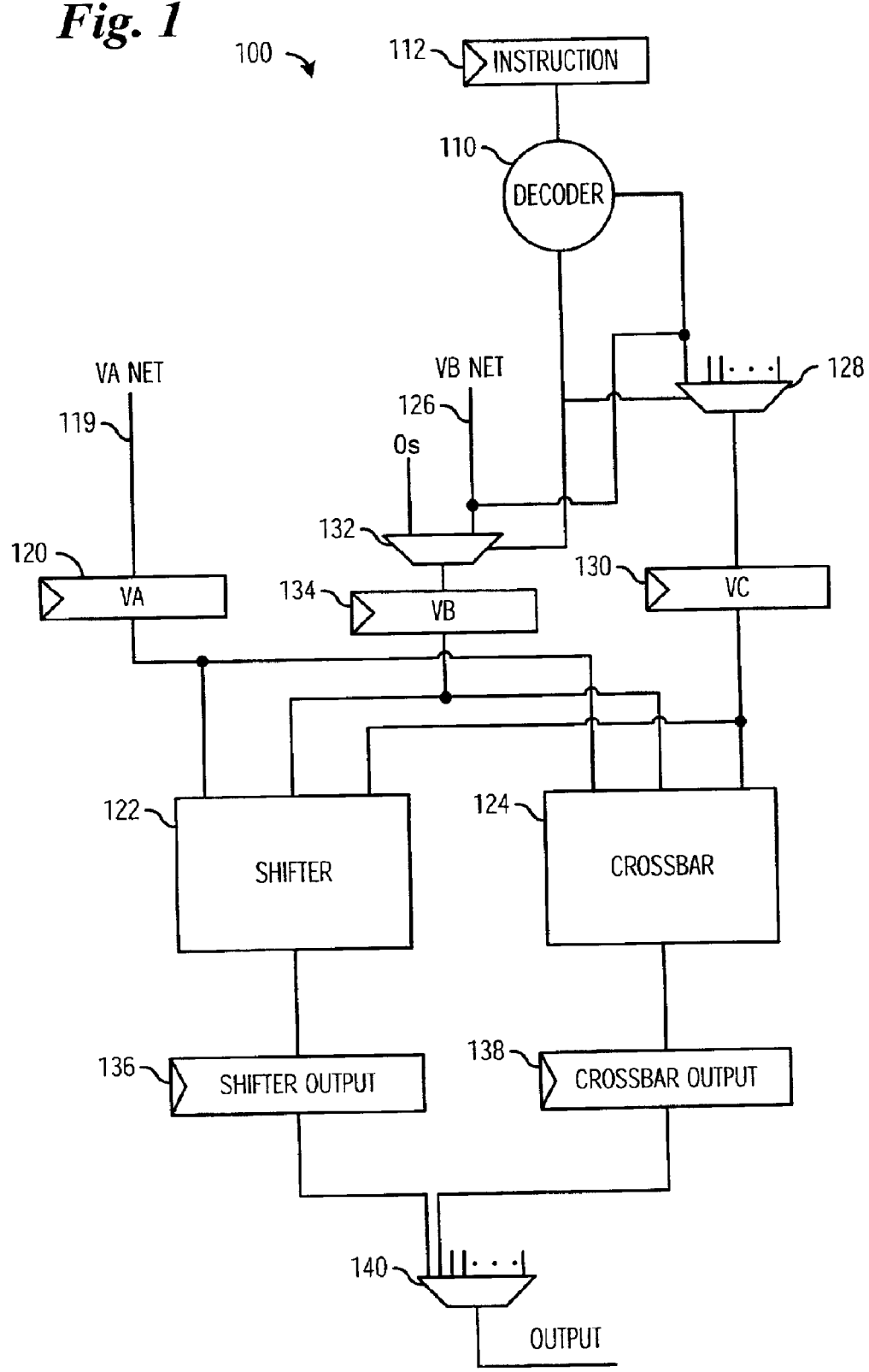
FIG. 1 is a schematic diagram of a typical circuit that embodies the present invention.
Figure 2:
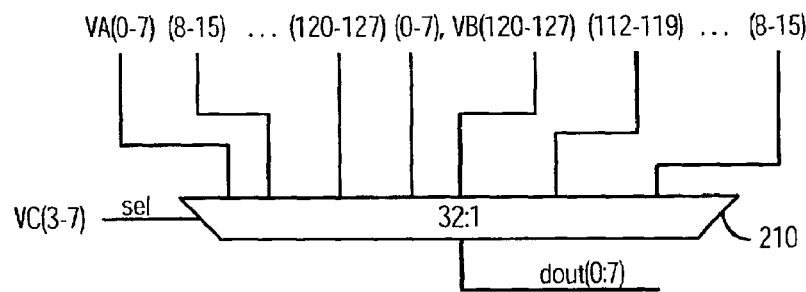
FIG. 2 is a schematic diagram of a circuit that illustrates one embodiment of the present invention that shifts an operand a specified direction and amount.
Figure 2:
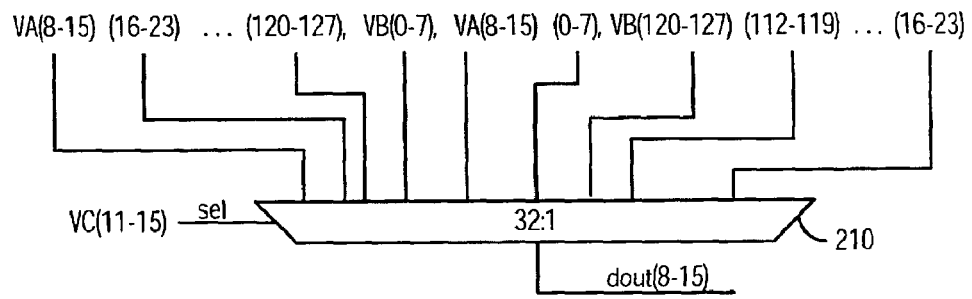
Figure 2:
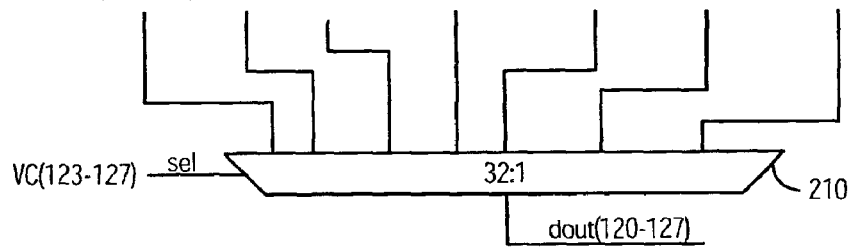

Referring to FIG. 1 of the drawings, the reference numeral 100 generally designates a circuit, which may be particularly useful in performing a vector shift instruction, such as a Vector Shift Left Octet (vslo), a Vector Shift Right Octet (vsro), and/or the like, of the Vector Multimedia Extension (VMX) standard for the PowerPC designed and developed by Apple Computers, Inc., IBM, Corp., and Motorola, Inc., embodying features of the present invention. The circuit 100 is exemplified herein as coexisting with another circuit, in this case a crossbar, commonly referred to as an XBAR function, that is capable of implementing many vector permute operations, such as vector packs, unpacks, merges, splats, and vector shift left double instructions, or the like, to demonstrate that additional efficiencies may be achieved by implementing the circuit 100 in conjunction with another compatible circuit. The circuit 100 may, however, be implemented with other types of circuits or individually. Furthermore, the discussion that follows and FIGS. 2 and 3 illustrate the present invention in terms of a 128-bit shift instruction for purposes of illustration only and should not be construed so as to limit the present invention in any manner. For example, the circuit 100 could be used with other types of circuits, individually, other bit lengths such as 64, 256, or the like, and the like, and is considered to be obvious to a person of ordinary skill in the art upon a reading of the present disclosure.

The circuit 100 generally comprises a decoder 110 configured for receiving and decoding an instruction 112. Generally, an instruction has the following format:

operation VT,VA,VB where:

operation is the requested action, such as vslo, vsro, or the like;

VT specifies the destination of the output;

VA specifies the operand to be shifted; and

VB specifies the operand that contains the shift amount.

The VA and VB operands may typically be any allowable data source (not shown), such as register files, bypasses, data forwarding, load ports, and/or the like, that is selectable via a mux (not shown). In FIG. 1, VA net 114 and VB net 126 represent the VA and VB operands, respectively, that are preferably sourced via mux from one or more data sources.

Preferably, one or more bits of the operand specifying the shift amount, e.g., bits 121–124 of VB net 126 of a vslo and a vsro instruction, are coupled to a mux 128. The select line of the mux 128 is controlled by the decoder 110, which selects the shift amount bits and shift direction when the decoder determines that the instruction 112 is a vslo or vsro instruction. The mux 128 is configured to latch the shift amount from the VB net 126, and an indication of the shift direction from the decoder, referred to as the VC operand 130, to the shifter 122 and the crossbar 124. In the preferred embodiment, the VC operand 130 is configured as 16 byte slices (16 byte slices times 8 bits/byte is 128 total bits). The shift direction is preferably specified in bit 3, which is from the decoder 110, and the shift amount, which is from bits of the VB net 126, is preferably specified in bits 4–7 of each byte slice, bits 0–2 being unused. The shift direction is preferably set to a "0" to indicate a left shift and to a "1" to indicate a right shift. As will be appreciated by one skilled in the art, each byte slice contains the same value and will be in the range of 0–31, with 0–15 indicating a left shift of 0–15 bytes and 16–31 indicating a right shift of 0–15 bytes.

VB net 126 is also coupled to a mux 132, whose select line is controlled by the decoder 110. The mux 132 is configured to allow the decoder 110 to select between the sourced operand, i.e., VB net 126, or a constant zero value. In the event that the decoder 110 determines that the instruction 112 is a shift instruction, such as vslo, vsro, or the like, the decoder 110 sets the select line of the mux 132 such that the zero constant value is latched as a VB operand 134 to the shifter 122 and crossbar 124.

It should be noted that the circuit 100 assumes that the shift instructions shifts the VA operand 120 left or right and fills the vacated positions with zeroes. Implementing other types of shifts, such as a circular shift, a signed shift, and/or the like, may be designed similarly and is considered obvious to a person of ordinary skill in the art upon a reading of the present disclosure.

The shifter 122 and the crossbar 124 is configured to provide a shifter output 136 and an crossbar output 138, respectively, preferably to a mux 140, which is used to select the output of one or more circuits, based on the instruction 112. Accordingly, the shifter output 136 is chosen for vslo and vsro instructions, and the crossbar output 138 or any other output done in parallel with the shifter and crossbar are chosen for all other instructions. Alternatively, data forwarding (not shown) may be enabled in order to obtain greater efficiencies.

FIG. 2 is a schematic diagram depicting a circuit that may be designed to perform operations of the shifter 122 (FIG. 1) in accordance with one embodiment of the present invention that receives a 128-bit VA operand 120 (FIG. 1) to shift, a 128-bit VB (zero filled) operand 134 (FIG. 1), and a VC operand 130 (FIG. 1) that specifies the shift direction and the shift amount as discussed above. Accordingly, $VA(x_1-x_2)$ represents a byte corresponding to the $x_1^{th}$ bit to the $x_2^{th}$ bit of the VA operand 120, $VB(y_1-y_2)$ represents a byte corresponding to the $y_1^{th}$ bit to the $y_2^{th}$ bit of the VB operand 134, and $VC(z_1-z_2)$ represents the $z_1^{th}$ bit to the $z_2^{th}$ bit of the VC operand 130. As noted above, the illustrated shifter is a byte shifter. Shifters of other amounts, such as words or bits, may be designed and are considered to be within the skills of a person of ordinary skill in the art upon a reading of the present disclosure.

As will be appreciated by one skilled in the art, the bits contained in each byte slice of the VC operand 130 that specify the shift direction and the shift amount, are used as a single 5-bit value ranging from 0–31. The 5-bit value is used as the select line of muxes 210 to select the corresponding byte of the designated input lines, forming the dout lines. The connection of the bits of the VA operand 120 and the VB operand 134 as shown shifts the VA operand to the left or right from 0 to 15 bytes, as specified by the 5-bit value.

For example, a vslo shift instruction with a shift value of 1 results in a VC operand 130 with each byte slice containing a "xxx00001" (binary), and, therefore, each select line of the muxes 210 are set to "1" (hex). As a result, the byte corresponding to the second mux data line (the first mux data line representing a shift of zero) is selected: dout(0–7)=VA (8–15), dout(8–15)=VA(16–23), . . . , dout(120–127)=VB (0–7). This equates to a shift left by one byte, bringing in one byte from VB, which contains all zeros.

For another example, a vsro shift instruction with a shift value of 15 results in a VC operand 130 with each byte slice containing "xxx11111" (binary), and, therefore, each select line of the muxes 210 are set to "1F" (hex). As a result, the byte corresponding to the thirty-second mux data line, i.e., the last mux data line, is selected: dout(0–7)=VB(8–15), dout(8–15)=VB(16–23), . . . , dout(120–127)=VA(0–7). This equates to a shift right by 15 bytes, filling vacated bytes of the VA operand with zeroes from the VB operand.

FIG. 3 is a flow chart depicting steps that may be performed by the circuit 100 in accordance with one embodiment of the present invention that shifts an operand to the left or right a specified number of bytes. Processing begins in step 310, wherein a shift instruction, such as vslo and/or vsro, is received and decoded. The shift instruction is decoded to determine, among other things, the type of instruction and hence the shift direction for vslo and vsro instructions. Upon receiving the instruction, in steps 320 and 322, the VA operand and the VB operand is retrieved, respectively, from the specified source, such as a register file, bypass, load port, and/or the like, as is described above.

In step 324, the VC operand is constructed. Preferably, as discussed above with reference to FIG. 1, the VC operand 130 comprises 16 bytes, each byte containing the shift direction in bit 3 and the shift amount in bits 4–7. Also after step 322, in step 326, the VB operand 134 is filled with zeroes for the vslo and vsro instructions.

After steps 320, 324 and 326, processing proceeds to step 328, wherein the VA operand 120 is shifted in the amount and direction specified by the VC operand 130, filling the vacated bytes with the value of the VB operand 134.

It is understood that the present invention can take many forms and embodiments. Accordingly, several variations may be made in the foregoing without departing from the spirit or the scope of the invention. For example, different data widths, such as 8, 16, 32, 64, 256, 512, and the like may be used, differing bit positions may be used for the VC mux selects, differing shift amounts, and/or different sources for the VC mux selects may be used.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method of shifting a first operand, the method comprising the steps of:

configuring a data input line for each byte of the first operand, each data input line comprising a first part and a second part, corresponding to successive shift amounts, wherein the first part of the data input line corresponds to a shift in a first direction and the second part of the data input line corresponds to a shift in a second direction; and selecting from the data input line for each byte, the bit value of which corresponds to the value of the shift amount and shift direction, wherein the shift direction is used to select a byte from the first part or the second part.

2. The method of claim 1, wherein the operand is at least one of a 16-bit operand, a 32-bit operand, a 64-bit operand, 128-bit operand, a 256-bit operand, and a 512-bit operand.

3. The method of claim 1, wherein at least one of the first part and the second comprises zeros to fill vacated bits with a zero.

4. A method of shifting a first operand, the method comprising the steps of:

extracting from an instruction a direction to shift the first operand;

extracting from a second operand an amount to shift the first operand;

configuring a data input line for each bit of each byte of the first operand, each data input line comprising a first part and a second part, wherein the first part comprises bits ordered corresponding to shift amounts in a first direction and the second part comprises bits ordered corresponding to shift amounts in a second direction; and selecting from each data input line the bit corresponding to the value of the shift amount and shift direction, wherein the shift direction is used to select a bit from the first part or the second part.

5. The method of claim 4, wherein at least one of the first part and the second part comprises zeros to fill vacated bits with a zero.

6. The method of claim 4, wherein the second operand is set to zero to provide the second part of the data input lines.

7. A method of performing vector permute operations, the method comprising the steps of:

receiving an instruction for a vector permute operation;

decoding the instruction to determine an instruction type, a first operand, and a second operand;

selecting from one or more resources the first operand;

selecting from one or more resources the second operand;

extracting from the instruction a direction to shift the first operand;

extracting from the second operand an amount to shift the first operand;

configuring a third operand to comprise the direction and the amount in one or more bytes;

performing a second function on the first operand and the second operand according to the values in the third operand;

performing a shifter function on the first operand and the second operand according to the values in the third operand;

determining whether the instruction type corresponds to the second function or to the shifter function;

upon a determination that the instruction type corresponds to the second function, setting the result of the vector permute operation to the output of the second function; and upon a determination that the instruction type corresponds to the shifter function, setting the result of the vector permute operation to the output of the shifter function.

8. The method of claim 7, wherein the step of performing the shifter function further comprises filling vacated bits with zeros with at least one of a first part and a second part of data input lines that comprise zeros.

9. The method of claim 7, wherein the second function is a CROSSBAR function.

10. The method of claim 7, wherein the step of performing the shifter function further comprises the second operand being set to zero to provide a second part of data input lines.

11. An apparatus for shifting a first operand, the apparatus comprising:

means for configuring for each bit of each byte of the first operand a data input line, comprising a first part and a second part, corresponding to successive shift amounts, wherein the first part of the data input line corresponds to a shift in a first direction and the second part of the data input line corresponds to a shift in a second direction; and means for selecting from the data input line for each bit the bit corresponding to the value of the shift amount and shift direction, wherein the shift direction is used to select a bit from the first part or the second part.

12. The apparatus of claim 11, wherein the operand is at least one of a 16-bit operand, a 32-bit operand, a 64-bit operand, 128-bit operand, a 256-bit operand, and a 512-bit operand.

13. The apparatus of claim 11, wherein at least one of the first part and the second part comprises zeros to fill vacated bits with a zero.

14. An apparatus for shifting a first operand, the apparatus comprising:

means for extracting from an instruction a direction to shift the first operand;

means for extracting from a second operand an amount to shift the first operand;

means for configuring a data input line for each bit of each byte of the first operand, each data input line comprising a first part and a second part, wherein the first part comprises bits ordered corresponding to shift amounts in a first direction and the second part comprises bits ordered corresponding to shift amounts in a second direction; and means for selecting from each data input line the bit corresponding to the value of the shift amount and shift direction, wherein the shift direction is used to select a bit from the first part or the second part.

15. The apparatus of claim 14, wherein at least one of the first part and the second part comprises zeros to fill vacated bits with a zero.

16. The apparatus of claim 14, wherein the second operand is set to zero to provide the second part of the data input lines.

17. An apparatus for performing vector permute operations, the apparatus comprising:

means for receiving an instruction for a vector permute operation;

means for decoding the instruction to determine an instruction type, a first operand, and a second operand;

means for selecting from one or more resources the first operand;

means for selecting from one or more resources the second operand;

means for extracting from the instruction a direction to shift the first operand;

means for extracting from the second operand an amount to shift the first operand;

means for configuring a third operand to comprise the direction and the amount in one or more bytes;

means for performing a second function on the first operand and the second operand according to the values in the third operand;

means for performing a shifter function on the first operand and the second operand according to the values in the third operand;

means for determining whether the instruction type corresponds to the second function or to the shifter function;

means for, upon a determination that the instruction type corresponds to the second function, setting the result of the vector permute operation to the output of the second function; and means for, upon a determination that the instruction type corresponds to the shifter function, setting the result of the vector permute operation to the output of the shifter function.

18. The apparatus of claim 17, wherein the means for performing the shifter function further comprises filling vacated bits with zeros with at least one of a first part and a second part of data input lines that comprise zeros.

19. The apparatus of claim 17, wherein the second function is a CROSSBAR function.

20. The apparatus of claim 17, wherein the means for performing the shifter function further comprises the second operand being set to zero to provide a second part of data input lines.

21. A computer program product for shifting a first operand, the computer program product having a medium with a computer program embodied thereon, the computer program comprising:

computer program code for configuring for each bit of each byte of the first operand a data input line, comprising a first part and a second part, corresponding to successive shift amounts, wherein the first part of the data input line corresponds to a shift in a first direction and the second part of the data input line corresponds to a shift in a second direction; and computer program code for selecting from the data input line for each bit the bit corresponding to the value of the shift amount and shift direction, wherein the shift direction is used to select a bit from the first part or the second part.

22. The computer program product of claim 21, wherein the operand is at least one of a 16-bit operand, a 32-bit operand, a 64-bit operand, 128-bit operand, a 256-bit operand, and a 512-bit operand.

23. The computer program product of claim 21, wherein at least one of the first part and the second part comprises zeros to fill vacated bits with a zero.

24. A computer program product for shifting a first operand, the computer program product having a medium with a computer program embodied thereon, the computer program comprising:

computer program code for extracting from an instruction a direction to shift the first operand;

computer program code for extracting from a second operand an amount to shift the first operand;

computer program code for configuring a data input line for each bit of each byte of the first operand, each data input line comprising a first part and a second part, wherein the first part comprises bits ordered corresponding to shift amounts in a first direction and the second part comprises bits ordered corresponding to shift amounts in a second direction; and computer program code for selecting from each data input line the bit corresponding to the value of the shift amount and shift direction, wherein the shift direction is used to select a bit from the first part or the second part.

25. The computer program product of claim 24, wherein at least one of the first part and the second part comprises zeros to fill vacated bits with a zero.

26. The computer program product of claim 24, wherein the second operand is set to zero to provide the second part of the data input lines.

27. A computer program product for performing vector permute operations, the computer program product having a medium with a computer program embodied thereon, the computer program comprising:

computer program code for receiving an instruction for a vector permute operation;

computer program code for decoding the instruction to determine an instruction type, a first operand, and a second operand;

computer program code for selecting from one or more resources the first operand;

computer program code for selecting from one or more resources the second operand;

computer program code for extracting from the instruction a direction to shift the first operand;

computer program code for extracting from the second operand an amount to shift the first operand;

computer program code for configuring a third operand to comprise the direction and the amount in one or more bytes;

computer program code for performing a second function on the first operand and the second operand according to the values in the third operand;

computer program code for performing a shifter function on the first operand and the second operand according to the values in the third operand;

computer program code for determining whether the instruction type corresponds to the second function or to the shifter function;

computer program code for, upon a determination that the instruction type corresponds to the second function, setting the result of the vector permute operation to the output of the second function; and computer program code for, upon a determination that the instruction type corresponds to the shifter function, setting the result of the vector permute operation to the output of the shifter function.

28. The computer program product of claim 27, wherein at least one of the first part and the second comprises zeros to fill vacated bits with a zero.

29. The computer program product of claim 27, wherein the second function is a CROSSBAR function.

30. The computer program product of claim 27, wherein the second operand is set to zero to provide the second part of the data input lines.

* * * * *